Patented July 12, 1932

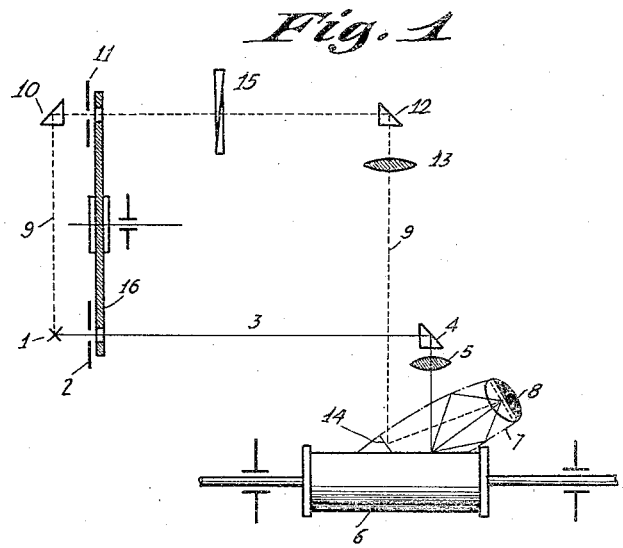
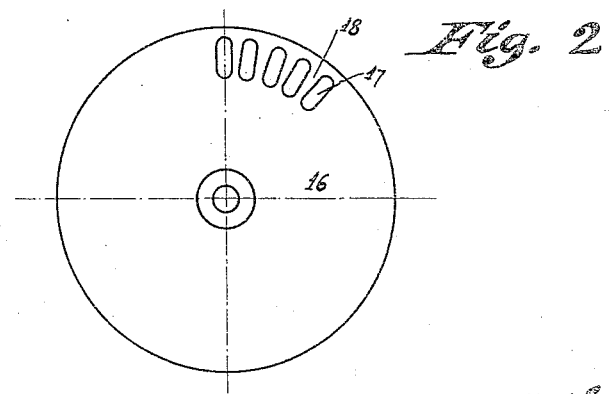
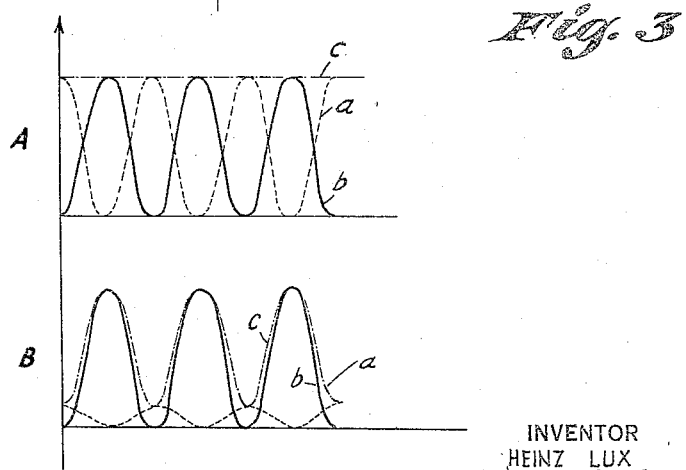

1,866,573

UNITED STATES PATENT OFFICE

HEINZ LUX, OF BERLIN, GERMANY, ASSIGNOR TO TELEFUNKEN GESELLSCHAFT FUR DRAHTLOSE TELEGRAPHIE M. B. H., OF BERLIN, GERMANY, A CORPORATION OF GERMANY

MEANS FOR REVERSING CURRENT IMPULSES

Application filed June 11, 1930, Serial No. 460,331, and in Germany April 30, 1929.

For the purposes of picture telegraphy circuit schemes have been disclosed in the prior art the object of which has been to so affect and act upon the current impulses produced by the scanning of pictures or copies, for example, by photoelectric cells, that, when scanning bright portions, the resulting potentials are low, whereas they turn out to be high for dark portions. In this manner it is possible to obtain at the receiving end positive pictures exactly corresponding to the brightness values of the original by the aid of recording or re-creating methods in which the blackening of the recorded picture elements is directly proportional to the transmitted potentials. The apparatus of this kind known in the prior art is characterized by that two photoelectric cells are employed, and these cells are so arranged that one thereof is illuminated in accordance with the brightness of the picture points scanned, while the other one is simultaneously subject to a constant illumination or else is replaced by another constant source of potential. The difference between the currents thus produced and the ensuing potentials thus exhibits the desired dependence upon the brightness of the picture, namely, that for bright picture points the potential should be lower than for dark ones.

The essential feature of an arrangement as hereinafter to be outlined resides in that only a simple photoelectric cell is used which is alternately illuminated from two sources of light, one of which is again influenced by the brightness of the scanned picture elements, while the other one is of constant intensity.

The arrangement has been shown in one of its preferred forms by the accompanying drawing, wherein:

Fig. 1 represents one form of the arrangement showing a plurality of light rays for illuminating and influencing the cell 1 in accordance with the picture frequencies, and the other in accordance with the chopper frequencies;

Fig. 2 shows a form of light chopping disk for use in connection with the system shown by Fig. 1; and, Fig. 3 shows the responsive curves in a system of the type shown by Fig. 1, wherein portion A designates the response when scanning light portions of the picture, and portion B indicates the response when scanning dark portions of the picture.

Now referring to Fig. 1 of the drawing, showing one solution of the problem and embodiment of the basic idea of this invention, a constant, preferably punctiform, light source 1 issues a pencil of rays 3 properly contoured by a diaphragm 2 by way of a deflection prism 4 and an objective 5 upon the picture carrier 6 supposed to consist of a revolving drum subject to simultaneous axial shifting. The light reflected diffusively from the copy or picture reaches the photoelectric cell 8 partly over the direct path and partly also by way of the reflecting surface 7 of suitable shape. From the same source of light 1, used to illuminate the picture copy, a second pencil of light rays 9 is thrown by way of the deflection prism 10 through a diaphragm 11, another deflection prism 12 and condenser lens 13 upon a mirror 14, whence the rays are directed towards the photoelectric cell 8. In order to be able to regulate the intensity of the said second pencil of rays, the latter are made to pass, for instance, a system of relatively shiftable grey cones 15. Both pencils of light are chopped by a rotating perforated disk 16.

As can be seen from the lateral view of the disk in Fig. 2, the said perforated disk 16 has a rim of slits, the width of the latter (indicated at 17) being equal to the width of the solid portions 18 between them. The two diaphragms 2 and 11 are so disposed in relation to the disk that one diaphragm is positioned just in front of the center of a slit, while the other one is covered up by the middle of the solid portion between the slits. The discharge currents of the photoelectric cell produced by both pencils, for the same construction of the diaphragms, present the same shape and a phase displacement angle relative to each other of 180 degrees. In the current diagram, Fig. 3, the current originating from pencil 3 is designated by $a$, the current originating from pencil 9 by $b$, while the sum total thereof is denoted by $c$. The diagram shows that when scanning a light point and by suitable adjustment of the intensity of the light ray 9 by means of the grey cones 15, the resultant current $c$, as shown by curve A, will be constant so that no A. C. potential will be produced, while when scanning a dark point, there results an A. C., as shown by curve B, whose frequency is predicated upon the number of revolutions and the number of holes of the perforated disk.

Having now described my invention, what I claim and desire to secure by Letters Patent is the following:

1. An optical scanning system which comprises a photoelectric element for converting varying intensities of light and shadow on a record surface into varying strength electric currents, and means for alternately illuminating the photoelectric element with interrupted light of variable intensity proportionate to the varying intensity of light and shadow on successive elemental areas of the record surface and with interrupted light of constant intensity so as to produce from the interrupted light intensities reaching the photoelectric element electric potentials in the output circuit of the photoelectric element which are inversely proportional to the brightness of the scanned record surface.

2. In a system for optically scanning pictures, a single photoelectric element for converting varying intensities of light and shadow on the picture record surface into varying strength electric currents, means for alternately illuminating the photoelectric element from two luminous paths, each alternately interrupted at the same predetermined rate, means for varying the intensity of light projected along one of the paths in accordance with the tone values of elemental areas of the scanned picture surface, and means for maintaining the intensity of illumination of the photoelectric element by light projected along the other light path constant, whereby, with substantially equal intensity light projected along both light paths, an alternating current potential of low amplitude results, and, with unequal intensity of light along the two light paths, an alternating current potential of relatively large amplitude results.

3. In a system for analyzing pictures, a photoelectric element for converting the picture tone values into varying strength electric currents, means for illuminating said cell by a plurality of independent light rays, means for varying the intensity of one of said rays in accordance with the picture tone values, whereby the amplitude of the output energy from the cell is proportional to the tone value of the picture, and means for alternately interrupting the light along each of said paths at a predetermined rate.

4. In a system for analyzing pictures, a photoelectric element for converting the picture tone values into varying strength electric currents, means for illuminating said cell by a plurality of independent light rays, means for varying the intensity of one of said rays in accordance with the picture tone values, whereby the amplitude of the output energy from the cell is proportional to the tone value of the picture, and a single light chopping disk for alternately interrupting the light along both of said paths at a predetermined rate.

5. In a system for analyzing pictures, a photoelectric element for converting the picture tone values into varying strength electric currents, means for illuminating said cell by a plurality of independent light rays, means for varying the intensity of one of said rays in accordance with the picture tone values, whereby the amplitude of the output energy from the cell is proportional to the tone value of the picture, and a single light chopping disk for alternately exposing the cell to illumination from each of said light paths and interrupting the light along each of said paths at a predetermined rate.

6. In light translating apparatus, a light responsive element, means for illuminating the said element by a plurality of independent light rays to produce resulting output currents therefrom, means in the path of the light rays to alternately interrupt the same to produce an alternating current output from the said element of a frequency corresponding to the frequency of interruption of each independent light ray, and means to vary the intensity of one of the independent light rays according to the relative light and dark areas of a subject of which an image is to be produced to vary the amplitude of the alternating current produced.

HEINZ LUX.